United States Patent
deRojas et al.

(10) Patent No.: US 6,773,108 B2
(45) Date of Patent: Aug. 10, 2004

(54) LENS WITH PHOTOCHROMIC ELASTOMER FILM AND METHOD OF MAKING IT

(75) Inventors: Agustin Alberto deRojas, Boca Raton, FL (US); Pallapalayam Muthusamy Thangamathesvaran, Boca Raton, FL (US)

(73) Assignee: Invicta Corporation, Boca Raton, FL (US)

( * ) Notice: Subject to any disclaimer, the term of this patent is extended or adjusted under 35 U.S.C. 154(b) by 370 days.

(21) Appl. No.: 09/814,174

(22) Filed: Mar. 21, 2001

(65) Prior Publication Data

US 2002/0136899 A1 Sep. 26, 2002

(51) Int. Cl.[7] .............................................. C08F 120/10
(52) U.S. Cl. ........................ 351/166; 351/162; 351/163
(58) Field of Search ................................ 351/162, 163, 351/166

(56) References Cited

U.S. PATENT DOCUMENTS

| | | | |
|---|---|---|---|
| 4,267,208 A | 5/1981 | Ireland | 427/154 |
| 4,498,919 A | 2/1985 | Mann | 65/30.11 |
| 4,556,605 A | 12/1985 | Mogami et al. | 428/331 |
| 4,679,918 A | 7/1987 | Ace | 351/163 |
| 4,756,973 A * | 7/1988 | Sakagami et al. | 351/166 |
| 5,164,228 A | 11/1992 | Peralta et al. | 427/164 |
| 5,244,602 A | 9/1993 | Van Gemert | 252/589 |
| 5,274,132 A | 12/1993 | Van Gemert | 549/389 |
| 5,340,857 A | 8/1994 | Van Gemert | 524/110 |
| 5,369,158 A | 11/1994 | Knowles | 524/110 |
| 5,381,193 A | 1/1995 | Wedding | 351/163 |
| 5,384,077 A | 1/1995 | Knowles | 252/586 |
| 5,405,958 A | 4/1995 | Van Gemert | 544/71 |
| 5,411,679 A | 5/1995 | Kumar | 252/586 |
| 5,429,774 A | 7/1995 | Kumar | 252/586 |
| 5,451,344 A | 9/1995 | Knowles et al. | 252/586 |
| 5,458,814 A | 10/1995 | Kumar et al. | 252/586 |
| 5,458,815 A | 10/1995 | Knowles | 252/586 |
| 5,462,698 A | 10/1995 | Kobayakawa et al. | 252/586 |
| 5,466,398 A | 11/1995 | Van Gemert et al. | 252/586 |
| 5,531,940 A | 7/1996 | Gupta et al. | 264/1.7 |
| 5,713,963 A | 2/1998 | Bensky | 8/507 |
| 5,975,696 A * | 11/1999 | Kohan | 351/163 |
| 6,065,836 A * | 5/2000 | Krishnan et al. | 351/166 |

* cited by examiner

Primary Examiner—Georgia Epps
Assistant Examiner—M. Hasan
(74) Attorney, Agent, or Firm—Proskauer Rose LLP

(57) ABSTRACT

A photochromic lens consists of a lens coated with an elastomeric film having a photochromic dye dispersed therein. The elastomeric provides abrasion resistance and some impact resistance to the lens. The photochromic lens is characterized by lower spectral transmission when activated, and shorter activation and deactivation times than previously known photochromic lenses. A method for making the photochromic lens consists of dissolving one or more photochromic dyes in an elastomeric pre-polymer solution, immersing the lens in the solution so that the lens becomes coated with the prepolymer solution, and treating the lens, for example, by heating, to cause said prepolymer to form an elastomeric film on the lens. Preferably, the pre-polymer solution is a polyurethane pre-polymer.

9 Claims, No Drawings

LENS WITH PHOTOCHROMIC ELASTOMER FILM AND METHOD OF MAKING IT

FIELD OF THE INVENTION

The invention relates to a novel process for coating one or both surfaces of a non-prescription, prescription, multifocal or progressive optical lens with an elastomeric film that contains a photochromic dye. The invention further provides photochromic lenses and eyeglasses produced by the method. The lens produced by this process has a high level of activation, and rapid activation and deactivation time. The present invention is applicable to all lens materials and is simple, quick and cost-effective.

BACKGROUND OF THE INVENTION

Photochromism is a phenomenon in which a compound, upon exposure to light containing ultraviolet rays, changes color, and, upon removal from light irradiation, returns to its original color. The color changes that occur in photochromic compounds are generally reversible. Photochromic dyes can be utilized in lenses and eyeglasses in order to protect the eyes from the harmful effects of the sun's ultraviolet radiation.

Photochromic dyes reversibly alter their color upon exposure to ultraviolet ("UV") sources. These dyes respond to UV irradiation, such as sunlight, by changing in color. When the UV stimulus is removed, the dye returns to a partially or completely colorless state. Photochromic dyes are not reactive in the crystalline state, and need to be dissolved in a polymer or solvent to function.

The production of mineral glass lenses that are photochromic is well known in the art. These lenses, however, possess certain drawbacks. In addition to being too heavy in weight, photochromic mineral glass lenses possess a slow photochromic deactivation time. The photochromic deactivation time is the time it takes for the lens to change back to its normal color upon moving from exposure to an ultraviolet source to a darker indoors environment.

Lenses and eyeglasses are now frequently made of plastic and glass-plastic composites. Such plastics include acrylic, PPMA (a product of PPG-Pittsburgh Plate Glass) also known as CR-39®, and Lexan® (a polycarbonate made by General Electric). Methods have been developed to render plastic lenses photochromic, although this has not been easy because of the chemistry involved in making plastic lenses.

Ethylene glycol diallyl dicarbonate is the most commonly used monomer for producing plastic optical or contact lenses. Generally, the lens is made by casting the monomer in a lens mold and polymerizing with a catalyst such as isopropyl percarbonate. This process, however, results in an inhibition of the photochromic dyes following polymerization of the organic material. This inhibition of the photochromic dyes is apparently caused by the catalyst used for polymerization. Thus, successful incorporation of photochromic dyes into the commonly used monomer ethylene glycol diallyl dicarbonate for the production of contact lenses from an organic material has not been achieved.

In addition, previously disclosed methods do not permit an optician or lens crafter to utilize simple stock lenses and provide an array of beneficial features such as photochromic properties, tinting, UV protection and scratch resistance. Furthermore, none of the previously disclosed methods result in producing a photochromic lens having rapid photochromic activation and deactivation times.

In addition to a plastic polymer, another type of polymer that can be utilized in the manufacturing of lenses is an elastomer. Elastomers have been utilized as film coatings on lenses to render them abrasion resistant and, to a certain extent, impact resistant. An elastomer is a polymer that is characterized by a high degree of resiliency and elasticity. Elastomers may be natural (rubber) or synthetic. Examples of synthetic elastomers include polyurethanes and polysiloxanes. An elastomer is capable of recovering its original shape after being stretched to a great extent. When stretched, the molecules of an elastomer are aligned and often take on aspects of a crystalline arrangement. Upon release, however, elastomers return to their natural disordered and entangled state. This return to their natural disordered state distinguishes elastomers from plastic polymers, which are normally glassy or crystalline and retain much of the shape to which they are deformed.

Elastomers have low glass transition temperatures. The glass transition temperature, $T_g$, is the temperature above which a polymer becomes soft and pliable, and below which it becomes hard and glassy. If an amorphous polymer has a $T_g$ below room temperature, it is an elastomer. If an amorphous polymer has a $T_g$ above room temperature, it will be a thermoplastic polymer and hard and glassy at room temperature.

U.S. Pat. No. 5,462,698 (Kobayakawa, et al.) is directed to forming a lens having photochromic compounds dispersed throughout. Kobayakawa discloses use of a resin compound having at least one epoxy group in the molecule as the resin for forming the photochromic lens. Koboayakawa requires the presence of multiple types of photochromic compounds in combination and polymerization in a heat furnace for between 2 to 40 hours. Also, as seen in Table 1, the resins disclosed in Kobayakawa as useful for producing photochromic lenses possess an average fading time to ½ density of 3 minutes as measured after exposure to light for 60 seconds. Thus, the photochromic resin disclosed in Kobayakawa is produced by a time-consuming process and possesses a rather slow photochromic response time.

U.S. Pat. No. 5,531,940 (Gupta et al.) discloses methods for making optical plastic lenses with photochromic additives. According to an embodiment of this invention, a casting resin having a low cross link density comprising polymerizable components (preferably including up to 50 wt % bisallyl carbonate) and photochromic additives, wherein all polymerizable components have a functionality not greater than two, is arranged between a mold and a lens preform, and then cured. Upon polymerization, the resin has a low crosslink density and forms a soft matrix that is unsuitable as the outer layer for photochromic lenses. Gupta et al. do not discuss photochromic reversal rates. The practical utility of the process disclosed by Gupta et al. is limited in that it is complex and time consuming. Furthermore, the photochromic material disclosed by Gupta et al. is described as being too soft for exposure to the environment.

U.S. Pat. No. 5,975,696 (Kohan), which is incorporated herein by reference, describes a photochromic lens and a method for making it. The process disclosed in Kohan involves dipping a lens into a solution comprising a nonpolar solvent containing a photochromic dye and a polar solvent. The lens is then removed, dried and exposed to very high temperatures to melt and spread the photochromic dye crystals on the lens surface. The solutions described in this patent do not include components that form elastomeric films.

U.S. Pat. No. 4,267,208 teaches coating of the convex side of an optical lens for blocking purposes by immersing the downwardly facing convex side in a liquid coating material in a can, upwardly withdrawing the lens above the level of the coating material but below the lip of the can, and spinning the lens about its vertically disposed axis to spread the coating material by centrifugal force as a uniformly thin film over the convex side, to create an edge buildup of coating material to form a thickened bead-like peripheral or rim portion at the periphery of the convex side, and to spin-off excess coating material against the inside of the can for reuse. This method requires complex apparatus and is not simple to carry out.

U.S. Pat. No. 5,164,228 also teaches the coating of a plastic ophthalmic lens with a scratch-resistant coating using a spin coating process.

None of the foregoing prior art patents, which are incorporated herein by reference, discloses a method for producing a photochromic lens having an elastomeric film coating, i.e., a lens coated with an elastomeric film dye or mixture of dyes dispersed therein.

The benefit of previously disclosed photochromic lenses is limited by slow activation and deactivation times, and limited activation levels. Slow deactivation times can result in impaired vision for a couple of minutes while the previously darkened lens returns to its clear, normal state, while slow activation times can cause inconvenience and/or harm to the eye due to a longer exposure time to UV sources. In addition, limited activation or darkening of the lens can result in inadequate protection from UV radiation and subsequent harm to the eyes.

A need thus exists for a simple and quick process for making a lens that can darken or activate to levels higher than that previously disclosed, and can deactivate rapidly so as to avoid impaired vision upon removal from exposure to an ultraviolet source. A need also exists for a lens that possesses such beneficial characteristics, while also containing an elastomeric film that allows for elasticity and impact resistance.

SUMMARY OF THE INVENTION

The present invention provides a novel process for producing a lens with an elastomeric film that contains a photochromic dye or a mixture of photochromic dyes. In accordance with the invention, a photochromic dye or mixture of dyes is dissolved in a solution containing the pre-polymer of an elastomer, which solution is then coated onto a lens, followed by treatment of the lens so as to form an elastomeric film containing the photochromic dye(s) dispersed therein on the lens. This process allows for the incorporation of photochromic dyes into elastomeric solutions and application of such elastomeric solutions onto a lens in order to form an elastomeric film and render such lens photochromic. The instant process enables any optometrist to easily and quickly produce a photochromic lens with an elastomeric film.

The presently claimed invention also provides photochromic lenses produced by the processes disclosed herein. The lenses produced by the inventive process have a darker activation and faster activation and deactivation times than previously known lenses, while also possessing the beneficial characteristic of impact and abrasion resistance due to the elastomeric film coating. The inventive process does not require time-consuming steps or expensive raw materials and can be carried out relatively simply. As such, the process of the instant invention is simple, quick and cost-effective. The present invention is well suited for fast, on-site custom lens production by, for example, an optometrist or optician, and is thus extremely commercially advantageous.

DETAILED DESCRIPTION OF THE INVENTION

As used throughout this specification, "lens" refers to optical or ophthalmic quality lenses or eyeglasses; "activation" refers to the extent of darkening or change in color of a photochromic lens upon exposure to a UV source; "activation time" refers to the time it takes for a photochromic lens to darken or change color upon exposure to a ultraviolet source; "deactivation time" refers to the time it takes for a photochromic lens to change back to its normal color upon moving from exposure to an ultraviolet source to a darker indoors environment; "elastomer" refers to a polymer that is characterized by a high degree of resiliency and elasticity and is capable of recovering its original shape after being stretched to great extents; "pre-polymer of an elastomer" refers to a pre- or partial polymer of an elastomer; "elastomeric film" refers to a lens film coating comprising an elastomer or commercially available cushion coat.

Lenses produced by the inventive process have higher or darker activation levels and faster activation and deactivation times than previously disclosed lenses. Upon exposure to UV sources, the lenses made by the inventive process typically darken up to levels allowing less than 40% spectral transmission (% T), as measured by a spectrocolorimeter. This darkening or activation occurs at rapid rates. Lenses produced by the present invention typically deactivate, i.e., return back to a nearly clear color upon removal from UV exposure, in less than 30 seconds to a state that allows more than 80% spectral transmission.

Although not wishing to be bound by any theory, it is believed that the elastomeric coating solutions used in the instant invention permit a greater concentration of photochromic dye resulting in darker lenses upon exposure to UV sources than prior art methods. It is also believed that the use of elastomers causes the photochromic molecules to open and close their aromatic rings at a faster rate resulting in the extremely rapid activation and deactivation times of the inventive lenses.

It is preferred that the lenses produced by the instant process have Shore A hardness values, as measured by a Shore A Durometer, in the range of about 30 to about 90 Shore A, preferably about 50 to about 70 Shore A, yet more preferably about 60 Shore A. Values above 90 Shore A are not preferred since a harder matrix would not allow for rapid activation and deactivation of photochromic molecules. It is preferred that the lenses produced by the inventive process exhibit % T values in the activated state of between about 10 to about 50% T, more preferably between about 20 to about 40% T, yet more preferably about 15 to about 30% T. Preferably, the lenses made by the instant invention exhibit % T values in the deactivated state of between about 75 to about 95% T, more preferably about 85 to about 95% T. Spectral transmission (% T) values were determined using a Hunter Laboratories spectrocolorimeter.

To produce the instantly claimed lenses, photochromic dye crystals are first fully dissolved in a solution containing a pre-polymer of an elastomer to form a completely homogenous solution. The process of the present invention allows for complete dissolution of the photochromic dye crystals into solution so that final lens product does not contain dye crystals melted or fused to its surface as occurs in the lenses produced according to U.S. Pat. No. 5,975,696. A preferred solution comprises a pre-polymer of an elastomer, preferably a polyurethane pre-polymer, a monomer and a solvent. In accordance with the preferred embodiments of the invention, a photochromic dye is dissolved in a solution containing a pre-polymer of an elastomer and a monomer; or in a solution containing a pre-polymer of an elastomer and a solvent; or in a solution containing a pre-polymer of an elastomer, a monomer and a solvent. More than one photochromic dye, more than one elastomer, more than one monomer and/or more than one solvent can be utilized in the solution. Suitable monomers include acrylates such as, for example, 2-hydroxyethyl methacrylate. Suitable solvents include, but are not limited to, n-methyl pyrrolidone, tetrahydrofuran, glycol ether, and ethylene glycol monobutyl ether. The solution can be partially or wholly elastomeric in nature.

Clear elastomeric compositions commercially available from SDC Coatings, Inc., under the name "Cushion Coatings," which are commonly used to improve abrasion and/or impact resistance, can also be utilized for the solution in which the photochromic dye is dissolved. Cushion Coatings that can be used in the present invention include, for example, SDC XF-1135® and SDC XF-1144®. SDC XF-1135® contains water in an amount of between 70–72% by weight, butoxy ethanol ("EB") glycol ether in an amount of between 13–14% by weight, and n-methyl pyrrolidone solvent ("NMP") in an amount of between 3–4% by weight. The water and EB glycol ether are present in SDC XF-1135® in a 5:1 ratio. SDC XF-1144® contains polypropylene glycol methyl ether ("PM glycol ether") in an amount of up to between 22–26% by weight.

After the photochromic dye is dissolved in the solution containing a pre-polymer of an elastomer, the solution is filtered and allowed to degas. A lens is mounted in a dipping fixture or device, immersed into the solution and then slowly withdrawn. In accordance with the invention, the solution can be applied on the front, back or both surfaces of a lens. When a lens is immersed according to the present invention, it is preferred that the surface being coated does not come in contact with the fixture carrying the lens. For example, if the front surface is being coated, a rubber vacuum nozzle can be attached to the back surface of the lens. Preferably, however, the dipping fixture is used to hold only the edges of the lens even if only one surface is being coated. If both surfaces are being coated, it is especially preferred that the dipping fixture be used to hold only the edges of the lens.

Any non-prescription, prescription, multifocal or progressive lens or eyeglass known in the art may be used in the presently claimed invention. Depending on the lens diameter in millimeters, the lens is smoothly withdrawn from the elastomer solution at a rate in millimeters per second sufficient to produce the desired coating at the desired thickness. The lens is then treated as known in the art to form an elastomeric film containing a photochromic dye on the lens. Such treatment can include any suitable means of drying or evaporation such as, for example, air drying and/or vacuum drying, heating, UV, visible or infrared curing in order to form an elastomeric film with photochromic properties. Air drying of the lens subsequent to its withdrawal from solution is preferred. Additional drying or evaporation steps including heating, vacuum drying or curing by UV, visible or infrared radiation may be employed in accordance with the invention.

When air drying the lens, it is preferred to utilize a device which holds the lens by its sides in an upright position. This avoids the potential for the solution coating to flow during drying and form a darker rim around the edge of a lens drying convex side up or form a darker center in a lens drying concave side up. Air-drying the lens in an upright position allows for an evaporation of the solution coating evenly over the entire surface of the lens. The lens is preferably air-dried for between about 20 to about 40 minutes, more preferably about 30 minutes. When heat drying is used, the lens is preferably heat-dried for between about 20 to about 40 minutes, more preferably about 30 minutes.

Many different types of synthetic elastomers exist. One type is a thermoplastic elastomer. Thermoplastic elastomers have reversible crosslinks. While normal crosslinks are covalent and chemically bond the polymer chains into one molecule, reversible crosslinks utilize noncovalent or secondary interactions between the polymer chains to bind the chains together. These interactions include hydrogen and ionic bonding. The noncovalent interactions allow the reversible crosslinks to be broken upon heating. Upon cooling, the crosslinks reform. Reversible thermoplastic elastomers useful for the instant invention include, for example, ionomers, such as the sodium salt of poly (ethylene-co-methacrylic acid), and block copolymers.

Another type of elastomer is a copolyester elastomer. Copolyester elastomers are composed of hard segments, made of a butylene terephthalate chain, and soft segments consisting of a poly tetramethyleneoxide glycol chain. Copolyester elastomer ether resins possess thermal stability at the molding temperature and a short molding cycle in comparison with other thermoplastic elastomers such as styrene-butadiene-styrene block copolymers and polyurethane. Copolyester elastomers also have insensitivity to moisture and a good elasticity at low temperatures. Examples of copolyester elastomers include block copolymers comprising polyisobutylene ("PIB") and any of the following: styrene, α-methylstyrene, methylmethacrylate, ethylmethacrylate and/or hydroxyethyl methacrylate.

Preferred elastomers are those that, in addition to having a high degree of resiliency and elasticity, are transparent and/or allow transmission of light and do not adversely react with photochromic compounds. Any elastomer known to possess these qualities, including those described herein, can be utilized in the present invention. Preferred elastomers include, but are not limited to, silicones, polyurethanes, synthetic elastomers, copolyester elastomers, fluoroelastomers, and thermoplastic elastomers possessing the foregoing properties.

Preferred synthetic elastomers include, for example, chlorosulfonated polyethylene, fluoroelastomers, neoprene, polysulfide and polyurethane. One component polyurethane compositions such as, for example, a pre-polymer containing excess isocyanate groups and a pre-polymer in which the isocyanate groups are blocked by a phenol, and the alkyl-type coatings can be utilized in accordance with the invention. Two component polyurethanes such as, for example, one containing isocyanate-terminated prepolymers and a polyfunctional alcohol can also be utilized in the instant invention.

Elastomers such as, for example, polydimethylsiloxane ("PDMS") and ethyl vinyl acetate ("EVA"), can also be used in accordance with the invention. Elastomeric compositions such as, for example, silicones or polyurethane pre-polymers and/or copolymers in combination with acrylates and/or methacrylates can also be used in the instant invention. Examples of such elastomeric compositions include silicone acrylate and polyurethane acrylate.

Although this invention is applicable to glass lenses, the use of plastic lenses is preferable due to their light weight and durability. Lenses that can be utilized in the instant invention include, but are not limited to, those made of diethylene glycol diallyl carbonate ("DAC"), marketed by AKZO Chemicals, Inc. of Dobbs Ferry, N.Y. and PPG Industries, Inc. of Pittsburgh, Pa. under the trademarks NOURYSET 200™ and CR-39®, respectively. The presently claimed process can be applied to any other preformed "plastic" optical lens regardless of the composition or manner in which such lens was formed.

As used herein a "plastic" lens is one made from optical quality resin materials. Such materials include, for example, mixtures containing allyl diglycol carbonates (such as "MasterCast 1" and "MasterCast 2" which are trademarks of Vision Sciences, Monrovia, Cal.; and CR-39® which is commercially available from PPG Industries), allylic esters such as triallyl cyanurate, triallyl phosphate, triallyl citrate, diallylphenyl phosphonate, acrylic esters, acrylates, methyl, allyl and butyl methacrylates, polycarbonates, styrenics, LEXAN®, polyesters such as those formed of ethylene glycol maleate, and other liquid monomer/polymer materials having high indices of refraction (such as HiRi which is a trademark of PPG Industries).

Preferred resin compositions include allyl diglycol carbonates, allylic esters, triallyl cyanurate, triallyl phosphate, triallyl citrate, diallyl phenyl phosphonate, acrylic esters, acrylates, methyl methacrylate, allyl methacrylate, butyl methacrylate, polycarbonates, styrenics, LEXAN®, polyesters, high index plastics, medium index plastics, urethanes, epoxies and silicones.

Photochromic compounds that can be used in the present invention include any reversible photochromic compound employed in the art. Examples thereof include naphthopyran compounds and other photochromic compounds as taught in U.S. Pat. Nos. 5,458,815; 5,458,814; 5,466,398; 5,384,077; 5,451,344; 5,429,774; 5,411,679; 5,405,958; 5,381,193; 5,369,158; 5,340,857; 5,274,132; 5,244,602; 4,679,918; 4,556,605; and 4,498,919, the disclosures of these patents being incorporated herein by reference.

Preferred photochromic compounds are those reversible photochromic compounds contained within the generic spirooxazine, naphthopyran, chromene and spiroindolinonaphthoxazine compound classes. In accordance with the invention, one or more photochromic dye compound from one or more of the above generic compound classes may be utilized for a single lens. For example, a spirooxazine and a naphthopyran photochromic compound can be mixed together and utilized in the instant invention.

The elastomeric solution and/or photochromic dye can additionally contain an adhesion promoter, one or more tints, a UV absorber, and other components conventionally employed in the industry.

The present invention will now be further explained in the following examples, which further describe, but do not limit the scope of the invention.

EXAMPLE 1

A film comprising a cushion coat and a photochromic dye was applied to a lens as follows. 90 g. of n-methyl pyrrolidone solvent ("NMP") was weighed into a 1 liter glass beaker. 110 g of blue spirooxazine photochromic dye crystals was added and stirred until the photochromic dye crystals were fully dissolved in the NMP solution. 900 g. of SDC XF-1135® cushion coat, which comprises a polyurethane pre-polymer dissolved in a solvent, was added to the 1 liter beaker and mixed to blend the cushion coat into the photochromic solution. This solution was then filtered and allowed to degas. An ophthalmic lens 65 mm in diameter was cleaned, mounted in a dipping fixture and fully immersed in the cushion coat/photochromic solution for 30 seconds. The lens was then slowly withdrawn from the solution at 5 mm per second. The lens was allowed to air dry until tack free, for about 30 minutes. The lens was then exposed to sunlight to determine its activation and deactivation times. Both the activation and deactivation times were less than 30 seconds. The spectral transmissions for the activated and deactivated states were also measured using a Hunter Labs spectrocolorimeter. The activated state had a percent transmission (% T) of less than 40 and the deactivated state had a % T of greater than 80.

EXAMPLE 2

A film comprising a cushion coat and a photochromic dye was applied to a lens as follows. 80 g. of tetrahydrofuran solvent was weighted into a 1 liter glass beaker. 20 g. of yellow naphthopyran photochromic dye crystals was added and stirred until a homogenous solution was achieved. 900 g. of SDC XF-1144® cushion coat, which comprises a polyurethane pre-polymer dissolved in a solvent, was added to this solution and stirred until a homogenous solution was achieved. The solution was filtered and allowed to degas for a few minutes. An ophthalmic lens 75 mm in diameter was cleaned, mounted on a dipping fixture and fully immersed in the cushion coat/photochromic solution for 30 seconds. The lens was then slowly withdrawn at a rate of 2.5 mm per second. The lens was air-dried for 30 minutes and heat-dried for an additional 30 minutes in a convention oven at a temperature of 95° C. The lens coating was dry and tack free after heating.

EXAMPLE 3

A film comprising an elastomer and a photochromic dye was applied to a lens as follows. 890 g. of polypropylene glycol methyl ether ("PM glycol ether") was weighed into a 1 liter glass beaker. 10 g. of orange naphthopyran photochromic dye crystals was added while stirring. The solution was then heated to 50° C. to facilitate dissolution of the photochromic dye crystals. The heated solution was then cooled to room temperature, followed by slow addition, while stirring, of 100 g. of polyurethane pre-polymer with —NCO ends until the pre-polymer was dissolved in the glycol solution. This solution was then filtered and allowed to degas in order to prevent air-entrapment in the elastomeric film. An ophthalmic lens 70 mm in diameter was cleaned, mounted on a dipping fixture and immersed in the solution for 30 seconds. The lens was then smoothly withdrawn at a rate of 3.5 mm per second. The lens was air-dried for 30 minutes and heat-dried for an additional 30 minutes at 100° C. to obtain a tack-free surface free of solvent residue. The resulting lens possessed 88% spectral transmission in the deactivated state and 26% spectral transmission in the activated state. The time required for both activation and deactivation was less than 45 seconds. The hardness of the elastomeric film was 65 Shore A as measured by a Shore A Durometer.

EXAMPLE 4

A film comprising an elastomer and a photochromic dye was applied to a lens as follows. 800 g. of ethylene glycol monobutyl ether was weighted into a 1 liter beaker. 10 g. of peach chromene photochromic dye crystals was added and stirred under heat until completely dissolved. 140 g. of polyurethane pre-polymer with —NCO ends was added and dissolved to yield a homogenous mixture, followed by addition, while stirring, of 50 g. of N,N,-dimethylaminoethylacrylate. The solution was filtered and allowed to degas in order to prevent air-entrapment in the elastomeric film. An ophthalmic lens 70 mm in diameter was cleaned, mounted in a dipping fixture and immersed in the solution for 30 seconds. The lens was then withdrawn from the solution at a rate of 3.5 mm per second, followed by air-drying of the lens for 30 minutes and subsequent heat drying at 100° C. for 30 minutes. The final lens had a tack-free surface free of solvent residue. The resulting lens possessed 88% spectral transmission in the deactivated state and 26% spectral transmission in the activated state. The time required for both activation and deactivation was less than 45 seconds. The hardness of the elastomeric film was 78 Shore A as measured by a Shore A Durometer.

Some elastomeric or cushion coat solutions may require brisk and/or ultrasonic mixing in order to completely dissolve the photochromic dye. Heating of these solutions may also improve solubility of the photochromic dye when needed. In addition, although the examples discussed herein utilized a dipping/immersion process for coating a lens, similar results were obtained using other methods of applying a coating to a lens surface, such as spin coating and air-less spray coating. Spin coating is a process where a lens is held by vacuum in a shaft spinning at between 200–1000 rpm and its surface is flooded with a coating solution. Air-less spray coating utilizes ultrasonic nozzles that atomize photochromic coating solutions and evenly deposit one or more layers of such solution on the lens surface. It is apparent to one of skill in the art that additional modifications within the scope of the invention can be readily made.

What is claimed is:

1. A photochromic lens comprising a lens coated with an elastomeric film in which a photochromatic dye is dispersed, wherein said elastomeric film has a hardness of between about 30 to about 90 Shore A.

2. The lens according to claim 1, wherein said elastomeric film has a hardness of about 60 Shore A.

3. The lens according to claim 1 wherein said lens has an activation time of less than 30 seconds.

4. The lens according to claim 1, wherein said lens has a deactivation time of less than 30 seconds.

5. The lens according to claim 1, wherein said lens has a percent spectral transmission in the deactivated state of between about 75 to about 95% T.

6. The lens according to claim 1, wherein said lens has a percent spectral transmission in the activated state of between about 10 to about 50% T.

7. The lens of claim 1 wherein said elastomeric film is made from a polyurethene.

8. The lens of claim 1 wherein said optical quality resin is a polycarbonate resin.

9. The lens of claim 1 wherein said optical quality resin comprises allyl diglycol carbonate.

* * * * *